(12) United States Patent
Gray et al.

(10) Patent No.: US 8,577,897 B2
(45) Date of Patent: Nov. 5, 2013

(54) RICH RESULTS RELEVANT TO USER SEARCH QUERIES FOR BOOKS

(75) Inventors: Matthew K. Gray, Reading, MA (US); Gregory H. Plesur, Arlington, MA (US); Garrett H. Rooney, Dedham, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/282,367

(22) Filed: Oct. 26, 2011

(65) Prior Publication Data

US 2012/0101982 A1    Apr. 26, 2012

Related U.S. Application Data

(60) Provisional application No. 61/407,002, filed on Oct. 26, 2010.

(51) Int. Cl.
G06F 7/00    (2006.01)
G06F 17/30    (2006.01)

(52) U.S. Cl.
USPC .................................................. 707/748

(58) Field of Classification Search
USPC ................................. 707/728, 748
See application file for complete search history.

(56) References Cited

U.S. PATENT DOCUMENTS

| 7,287,214 B1 | 10/2007 | Jenkins et al. | |
| 2006/0031214 A1* | 2/2006 | Solaro et al. | 707/4 |
| 2007/0208733 A1* | 9/2007 | Brault | 707/5 |
| 2008/0091667 A1 | 4/2008 | Nair | |
| 2008/0306928 A1* | 12/2008 | Brunner et al. | 707/4 |
| 2010/0138425 A1 | 6/2010 | Lin et al. | |
| 2010/0262518 A1* | 10/2010 | Hillis et al. | 705/27 |

OTHER PUBLICATIONS

International Search Report from related PCT Application No. PCT/US 11/57922, mailed Jan. 19, 2012, 19 pages.

* cited by examiner

*Primary Examiner* — Hosain Alam
*Assistant Examiner* — Van Oberly
(74) *Attorney, Agent, or Firm* — Fish & Richardson P.C.

(57) ABSTRACT

Methods, systems, and apparatus, including computer programs encoded on computer storage media, for triggering rich results in response to publication queries. In one aspect, a method includes receiving a publication query. One or more publication search results are obtained. A rich result is triggered based on a score of the first-ranked publication result if it meets a threshold relative to other publication search results. The rich result is populated with additional metadata about the publication obtained from web resources and product resources from multiple corpora. The rich result is provided with the publication search results.

61 Claims, 7 Drawing Sheets

RICH RESULTS RELEVANT TO USER SEARCH QUERIES FOR BOOKS

CROSS-REFERENCE TO RELATED APPLICATIONS

This application claims the benefit under 35 U.S.C. §119(e) of U.S. Provisional Application Ser. No. 61/407,002, filed on Oct. 26, 2010 entitled "Rich Results Relevant to User Search Queries for Books," the entirety of which is hereby incorporated by reference.

BACKGROUND

This specification relates to providing information relevant to user search queries.

Internet search engines identify resources, e.g., web pages, images, text documents, and multimedia content, in response to queries submitted by users and present information about the resources in a manner that is intended to be useful to the users.

SUMMARY

Users of search engines are often looking for information about a specific entity, for example a book, rather than a listing of individual resources.

This specification describes technologies relating to presenting a rich result in response to a search query, where it is determined that the query relates to a particular book or other publication. The rich result is a formatted presentation of content that is relevant to the query and that contains pieces of information from multiple collections of information. For example, the rich result may contain links to the publisher's website, seller websites, or informational websites. The rich result may additionally include information about the publisher, publication year, pages in the book, and a snippet or synopsis from the book.

In general, one innovative aspect of the subject matter described in this specification can be embodied in methods that include the actions of receiving a query requesting a publication search, the publication search being a search of a corpus of digital book resources that each relate to a particular publication, obtaining publication search results responsive to the query from the corpus of book resources, determining that a score for a first publication result ranked first in a ranked order of publication search results satisfies a threshold relative to respective scores of other publication search results, where the first publication result is associated with a publication, searching a corpus of web resources using data associated with the first publication result to obtain one or more web resources that reference the publication, generating a rich result for the first publication result, where the rich result comprises data from the first publication result and the one or more web resources, and providing the rich result with the publication search results. Other embodiments of this aspect include corresponding systems, apparatus, and computer programs recorded on computer storage devices, each configured to perform the actions of the methods.

These and other embodiments can each optionally include one or more of the following features. The score for the first publication result satisfies the threshold if the score is at least a threshold multiple of a score for a book search result ranked second in the ranked order of publication search results. The score for the first publication result satisfies the threshold if the score is at least a threshold multiple of a score for a publication search result ranked third or fourth in the ranked order of book search results. Generating the rich result further comprises obtaining price information for the publication, and including price information with the rich result. Obtaining the price information comprises obtaining the price information from a products corpus. The publication is a book. Obtaining the price information from a products corpus comprises providing a products corpus with an ISBN and receiving a price for a book corresponding to the ISBN. Providing a products corpus with an ISBN comprises obtaining the ISBN from the data associated with the first publication result. Generating a rich result comprises correcting data from the corpus of book resources using data from the web resources. Correcting data from the corpus of book resources comprises comparing the data from the corpus of book resources with one or more variants of the data from the web resources and selecting the most popular variant for the rich result.

These and other embodiments can each optionally include one or more of the following features. The rich result further comprises a publication snippet. The snippet is a publication excerpt or a publication summary. The rich result further comprises one or more authors of the publication. Correcting data from the corpus of book resources further comprises correcting the one or more authors of the publication using data from the web resources. The rich result further comprises a link to a preview of the publication. The one or more web resources comprise links to related websites. The one or more web resources comprise links to book seller websites. The rich result further comprises publisher information for the publication. The publisher information comprises a link to a website of a publisher of the publication. The method further comprises correcting the publisher information using data from the web resources.

Particular embodiments of the subject matter described in this specification can be implemented so as to realize one or more of the following advantages. Users can be presented with relevant information about publications in response to their search queries. Users can be provided with a richer publication search experience through an interface that provides them easy access to information related to the publication referred to in the search query. Users can easily find publication information and websites related to their search queries. Users can be provided convenient ways to purchase publications they have searched for.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Search systems provide access to many kinds of digital resources. Some search systems provide access to book resources, that is, resources that have been identified as relating specifically to books and similar publications, e.g., magazines and journals. In response to a search query, the search system can provide search results that identify book resources for publications matching the query. A book resource may include one or more of the full text of a publication, a preview of the publication, a snippet and other information extracted from the publication, or bibliographic information about the publication, for example.

Additional resources accessible on a network, such as the Internet, may also pertain to a publication identified in the book resources. These resources may include, for example, a publisher's website, book review websites, book seller websites, or book synopsis websites. Each resource can independently provide multiple pieces of information about the publication, many of which may overlap.

These independent pieces of information can be located, combined, and presented, along with the search results for the book resources, as a rich result. Providing this additional information can greatly ease the task of locating information relevant to the publication.

Figure 1:
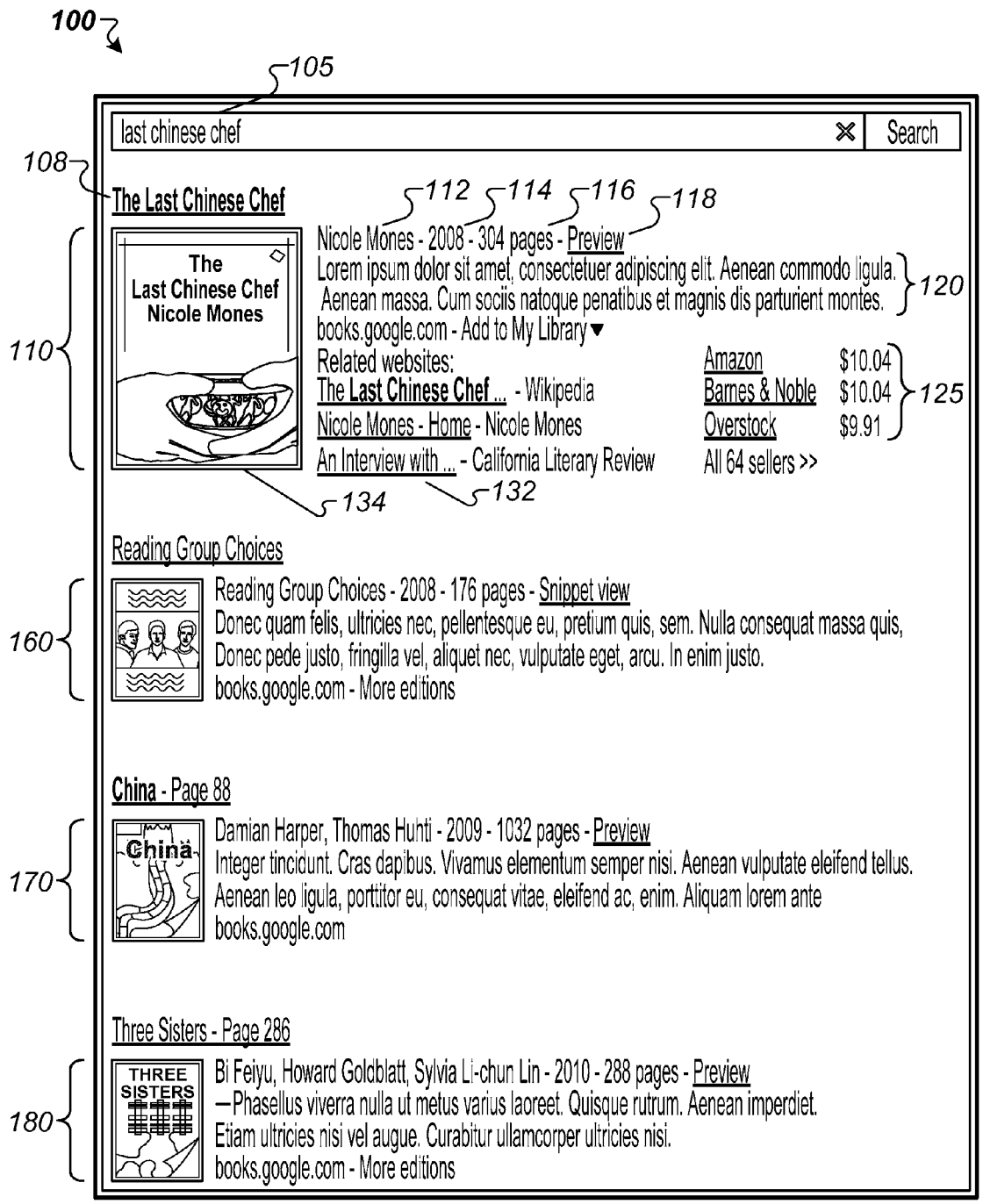
FIG. 1 is an illustration of an example rich result.

FIG. 1 is an illustration of an example rich result. The search system results web page 100 provides results 110, 160, 170, and 180 that are responsive to the query 105, "last chinese chef."

The result 110 is a rich result providing various pieces of information about the book "The Last Chinese Chef," by Nicole Mones. These include the title 108, the author 112, the publication year 114, the number of pages 116, and a link to a preview of the book 118. Additionally, a synopsis of the book 120 can be provided as part of the rich result, in addition to a thumbnail image of the book's cover 134.

Hyperlinks to book sellers and associated prices for the book 125 can also be provided. A user selecting these links in a web browser or like interface would be taken to a website where the book had been offered at the listed prices.

In addition, links to related websites 132 may be provided. Related websites may include the publisher's website, a book review website, or a website that contains a summary of the book. A user selecting these links would be taken to their associated websites.

In some implementations, these additional pieces of information about the book are gathered from resources other than the collection of books resources used to obtain results 160, 170, and 180.

Figure 2:
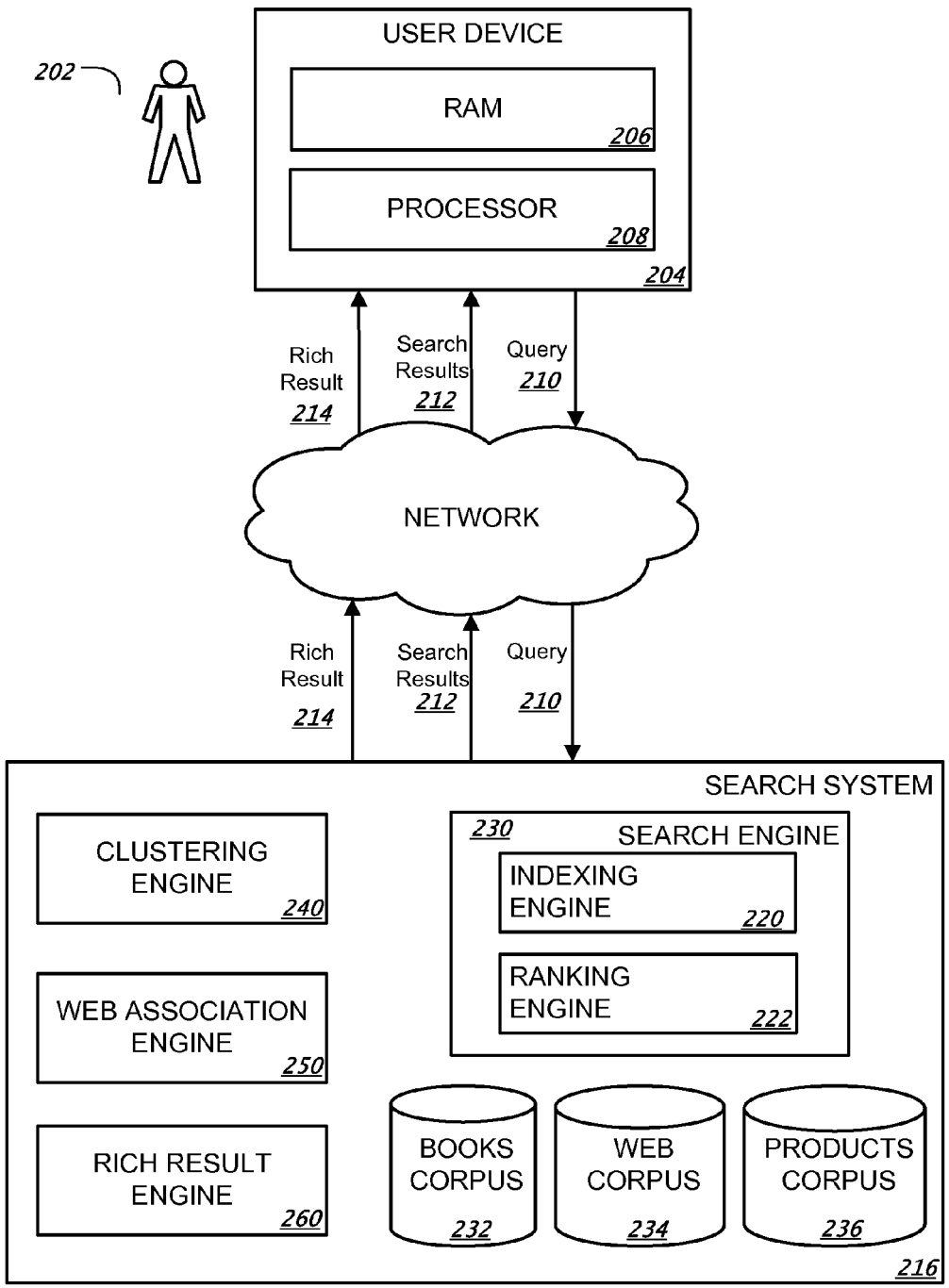
FIG. 2 is an illustration of an example search system.

FIG. 2 is an illustration of an example search system 216. The example search system can provide search results relevant to submitted queries and can be implemented in an Internet, an intranet, or another client and server environment. The search system 216 is an example of an information retrieval system in which the systems, components, and techniques described below can be implemented.

A user 202 can interact with the search system 216 through a user device 204. For example, the user device 204 can be a computer coupled to the search system 216 through a local area network (LAN) or wide area network (WAN), e.g., the Internet. The user device 204 will generally include a random access memory (RAM) 206 and a processor 208.

A user 202 can submit a query 210 to a search engine 230 within a search system 216. When the user 202 submits a query 210, the query 210 is transmitted through a network to the search system 216. The search system 216 can be implemented as, for example, computer programs running on one or more computers in one or more locations that are coupled to each other through a network. The search system includes an index database (not shown) and a search engine 230. The search system 216 responds to the query 210 by generating search results 212, which are transmitted through the network to the user device 204 in a form that can be presented to the user 202 (e.g., as a search results web page to be displayed in a web browser running on the user device 204).

When the query 210 is received by the search engine 230, the search engine 230 identifies resources that match the query 210. The search engine 230 will generally include an indexing engine 220 that crawls and indexes resources (e.g., books, web pages, images, or news articles stored as addressable resources accessible over the Internet) found in a corpus (e.g., a collection or repository of content), an index (not shown) that stores the index information in one or more indices, and a ranking engine 222 (or other software) to rank the resources that match the query 210. The indexing and ranking of the resources can be performed using conventional techniques. The search engine 230 can transmit the search results 212 through the network to the user device 204 for presentation to the user 202.

To perform the process of determining whether to generate and present (in other words, to trigger) a rich result 214 for a book search result, and what the rich result should include, the search system 216 will use the functionality provided by a clustering engine 240, a web association engine 250, and a rich result engine 260. The search system 216 may also access resources stored in multiple corpora, such as a books corpus 232, a web corpus 234, and a products corpus 236. The books corpus contains book and publication resources, that is, resources that relate specifically to books and similar publications, e.g., magazines and journals.

The clustering engine 240 clusters multiple resources containing book or publication information. Information about each resource is stored in a corresponding metadata record. Overlapping pieces of information in the metadata records are identified and clustered together. Clustering information—i.e., information denoting which resources (and metadata records) are part of which clusters—can be stored with the metadata records for each publication. For example, one resource may contain the title of a book, while a second resource may contain the title of the same book and the author of the book. By clustering the metadata records of these resources by using overlapping data, resources that refer to the same or similar publications are identified.

The web association engine 250 uses the metadata records clustered by the clustering engine 230 to identify those indexed network resources (e.g., web resources) that mention or are otherwise related to the publication. For example, the web association engine 250 may identify an online encyclopedia page about a book or a website that provides a review of the book.

The rich result engine 260 can compare information in multiple corpora to improve the data quality of the information provided in a rich result. For example, the rich result engine 260 can determine a correct capitalization for a book title by comparing variant capitalizations of the book title in multiple corpora and selecting the most popular variant. The rich result engine 260 also determines whether a rich result 214 should be triggered as part of a response to a publication query. For example, the rich result engine 260 may trigger a rich result only for publications that meet a particular popularity threshold.

Figure 3:
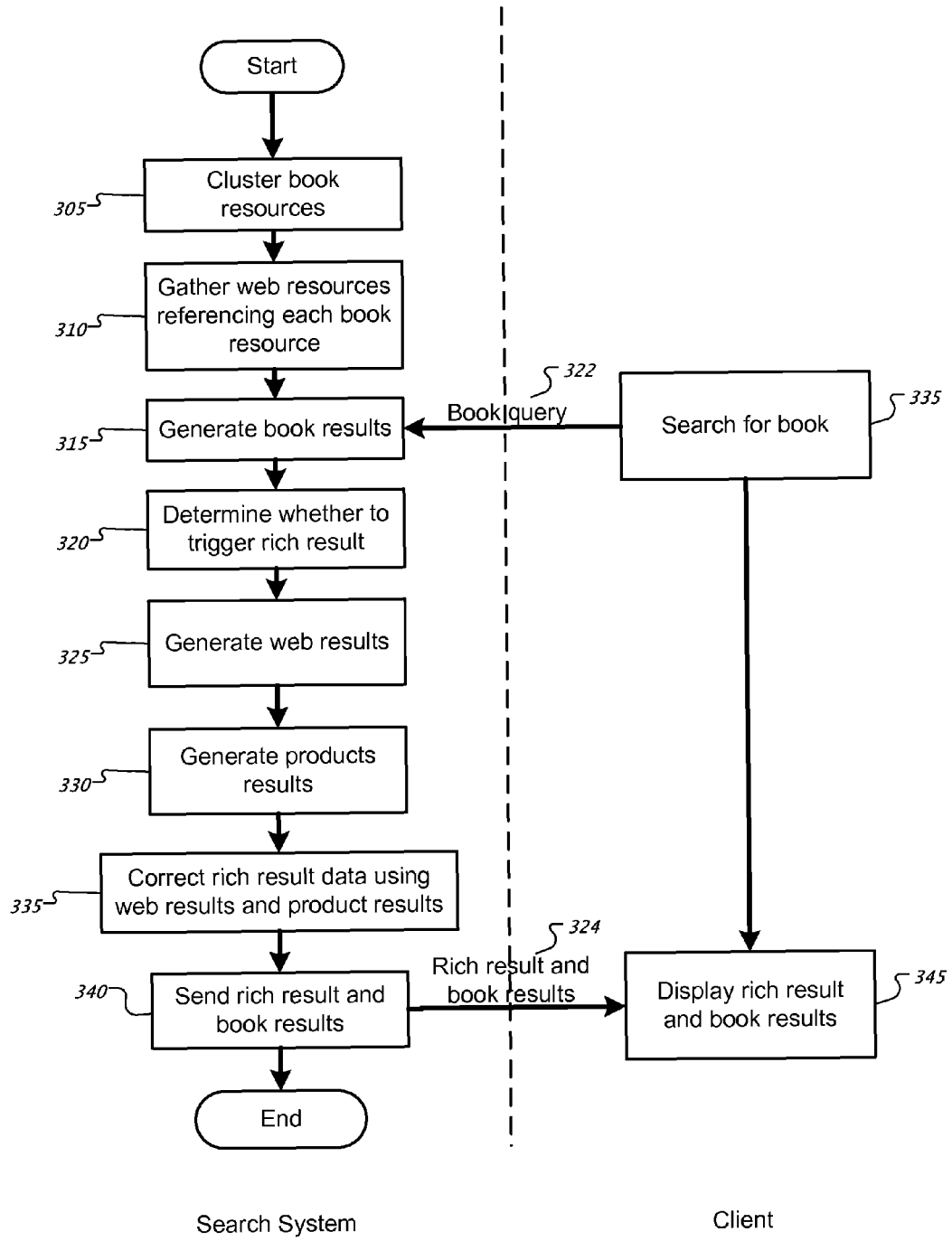
FIG. 3 is a sequence diagram for generating and triggering a books rich result.

FIG. 3 is a sequence diagram for operations involved in generating and triggering a rich result for a publication, in particular, a book. In general, a search system obtains information relating to a book and uses the information to create a rich result. The search system can receive a query from a client device, determine that the query relates to a book and that a rich result should be triggered, and provide the rich result and book search results to the client device.

Book resources are clustered using a metadata record for each resource (305). Metadata for each book resource is obtained from the clustered metadata records.

Web resources that include or refer to metadata for each book resource are identified (310). The web resources could include a publisher's website about the book, an online encyclopedia entry about the book, or a seller's website through which the book can be purchased. The system can use confidence and topicality values, described in more detail below in reference to FIG. 6, to determine whether a web resource should be identified as referring to a book resource. For example, the system can analyze all web resources in a web corpus, or the system can analyze only web resources obtained in response to a web search, as described below in reference to FIG. 6.

When a book search is initiated, by a user, for example (335), a book query 322 is delivered to the search system. The search and query are identified as a book search and query by the user, for example, when the user selects a "book search" interface to present the query, or when the user includes a predefined keyword in the query.

The search system generates book results that identify book resources that are responsive to the book query 322 (315).

The search system determines whether a rich result should be triggered and presented with the search results (320). In some implementations, the search system triggers a rich result when the score of the first-ranked result in the book results is substantially higher than any of the other book results.

The search system generates web results that identify web resources that are responsive to the book query 322 (325). The system can perform a web search using terms of the book query 322 to obtain a set of web search results. The system can then determine which web resources identified by the web search results refer to a book resource that corresponds to the first-ranked book search result. Web resources that refer to book resources can be identified as described below in reference to FIG. 6. In some implementations, the system can obtain web search results by performing a web search using a query related to but different than the book query. For example, instead of using the book query, the web search results could be obtained by performing a search using a query derived from information in the metadata record of the book resource associated with the first-ranked result in the book results.

The search system generates products results that identify web resources that are responsive to the book query 322 (330). In some implementations, the products search results are obtained by performing a product search on a query generated from using information in the metadata record of the book resource associated with the first-ranked result in the book results. For example, the products results could be obtained by using the ISBN of the book associated with the first-ranked result in the book results. Products results generally include a variety of pieces of information about a publication, including the price of the publication.

The book data is corrected by using information from multiple corpora (335). For example, the correct capitalization of a book title can be determined by using the most popular variant of multiple title capitalizations from multiple corpora.

The search system sends the book results responsive to the query and the rich result to the user device (340).

The user device receives the book results responsive to the query and the rich result 324 and displays the rich result and the book results for a user (345).

Figure 4:
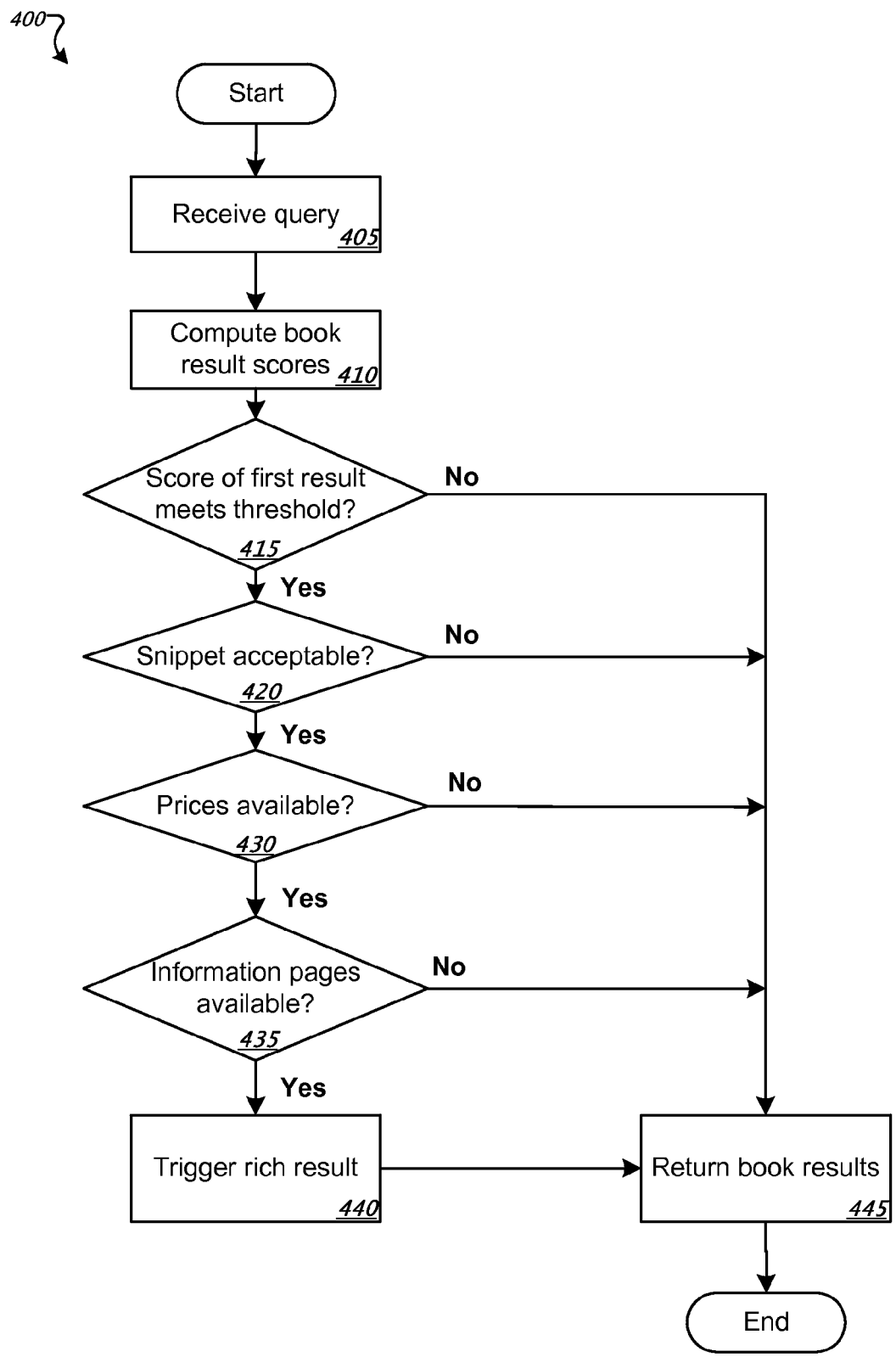
FIG. 4 is a flowchart of an example triggering process.

FIG. 4 is a flowchart of an example triggering process 400. The example process 400 determines whether a rich result should be triggered for a given set of publication search results. The process will be described as being performed by a computer system that includes one or more computers, e.g., the search system described above.

The system receives a query 405. The query may include terms from the title of a book, e.g., "last chinese chef."

The system determines scores for book results responsive to the query (410). In some implementations, the scores indicate how relevant each book resource is to the received query.

The system checks the score of the first result against a threshold. If the score does not meet the threshold, the system will not trigger a rich result and will instead present only regular book results (branch to 445). In some implementations, the threshold is a multiple of the score of the second search result. For example, if the threshold is 10 times the second search result, the rich result will only be triggered if the score of the first search result is at least 10 times that of the second search result. This can ensure that only results which are highly relevant to the search query trigger rich results. In some other implementations, the threshold is a multiple of the score of the third, fourth, or other search results. In some implementations, after an initial condition (415) has been met to trigger the rich result, a number of additional conditions must also be met in order to trigger the rich result.

The system may require that a book search result have an acceptable snippet of the book available before triggering a rich result. For example, the system may check the snippet of the book to determine if the snippet is acceptable (420). For example, an acceptable snippet might include a summary from the publisher's website. For example, an unacceptable snippet might include a user-submitted snippet containing grammatical errors or informal language. If the snippet is unacceptable, a rich result will not be triggered (branch to 445). If the snippet is acceptable, additional conditions can be checked (430).

The system may require that a price of the book be provided by at least one book seller before triggering a rich result (430). If no prices are available, the rich result will not be triggered (branch to 445). If prices are available, additional conditions can be checked.

The system may additionally check that web pages of information about the book be available (435). An information page about the book can be, for example, a publisher's web page about the book or an online encyclopedia entry about the book. If no information pages are available, no rich result will be triggered (branch to 445).

If all conditions are satisfied, the system triggers the rich result (440). In some implementations, this causes the search system to return a block of information about the book in addition to the book search results. For example, the search system may return a rich result as depicted in FIG. 1 in response to the user book query "last chinese chef."

Book results responsive to the user query are returned to the user as a response to the query (445). If a rich result was triggered, the rich result will be included with the book results provided in response to the search query.

Figure 5:
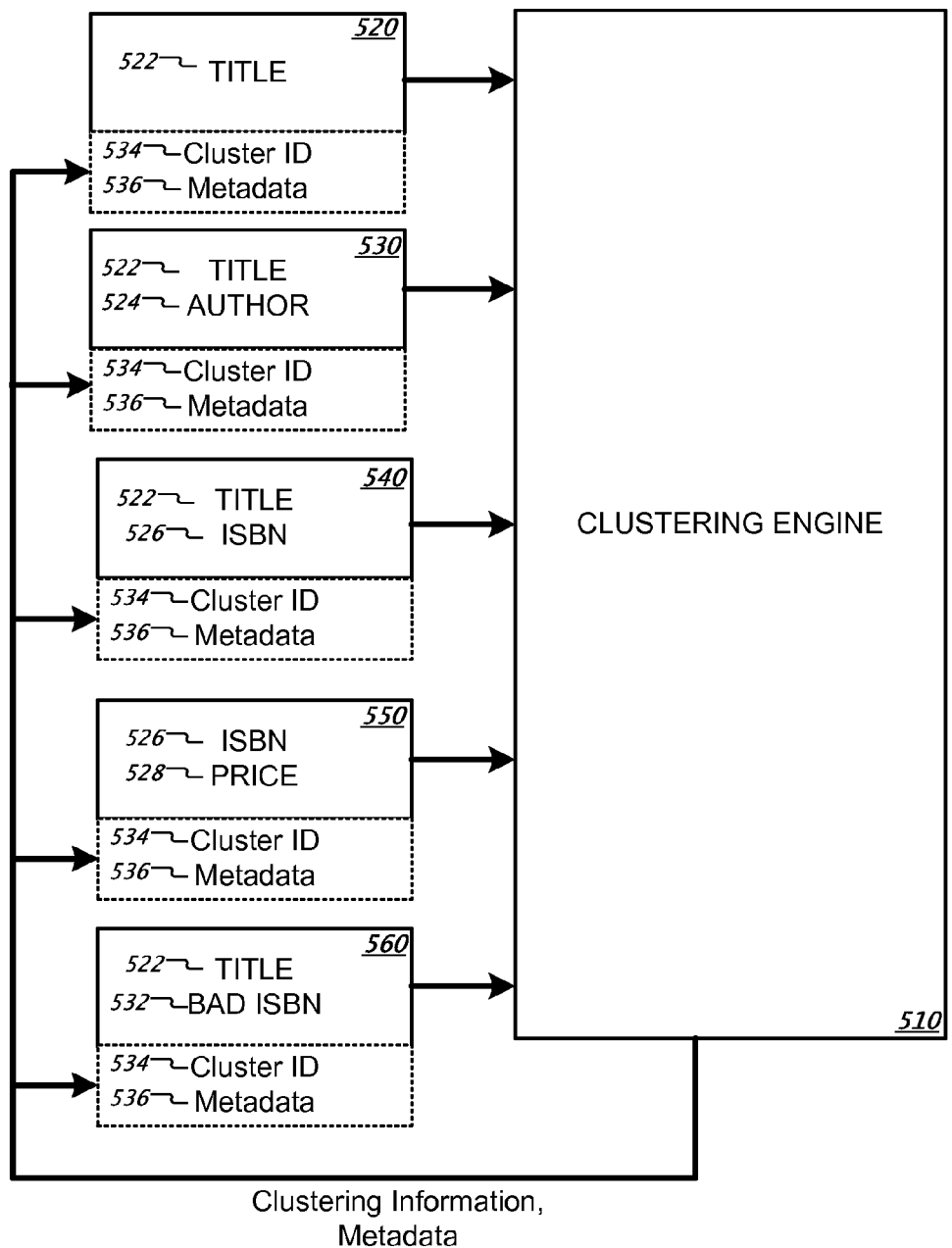
FIG. 5 is a diagram of a clustering engine.

FIG. 5 is a diagram of a clustering engine 510. The clustering engine 510 clusters together multiple book resources by using metadata for each book resource. Cluster information and a best metadata representation for a publication can be stored in the metadata of each book resource.

The clustering engine 510 can read metadata from multiple book resources 520, 530, 540, 550, and 560 to locate overlapping information. These resources can be any type of resource that contains information about a book. They can be, for example, pages on a publisher's website; a scanned page from the book itself listing the title, publisher, and publication date; or pages on a seller's website listing the price and number of pages in the book.

For example, resource 520 contains only the title of the book 522. Resource 530 contains the title of the book 522 and the author of the book 524. Resource 540 contains the title of the book 522 and the international standard book number ("ISBN") of the book 526. Resource 550 contains the ISBN 526 and the price of the book 528. Resource 560 contains the title of the book 522, and an incorrect ISBN 532.

In some implementations, the clustering engine 505 reads information from resources 520, 530, 540, 550, and 560, and determines data that is overlapping. In some implementations, the clustering engine determines overlapping data by using agglomerative clustering algorithms. Agglomerative clustering builds a hierarchical tree structure by successively joining nearest nodes. In some implementations, each node is a resource containing book information. In some other implementations, each node represents one piece of information about the book, such as the book title 522.

After the clustering engine has clustered data from resources 520, 530, 540, 550, and 560, the clustering engine can annotate the metadata for each resource with cluster information 534 and additional metadata information 536. In some implementations, the additional metadata 536 contains data values that represent what the clustering engine has determined to be the best metadata representation of that particular publication. For example, the title 522 may have appeared correctly in nearly all resources containing information about the book, and may therefore match information in the additional metadata 536. In contrast, the incorrect ISBN 532 may have appeared in only one resource because of its inaccuracy. Therefore, the incorrect ISBN 532 will not match the additional metadata 536.

Figure 6:
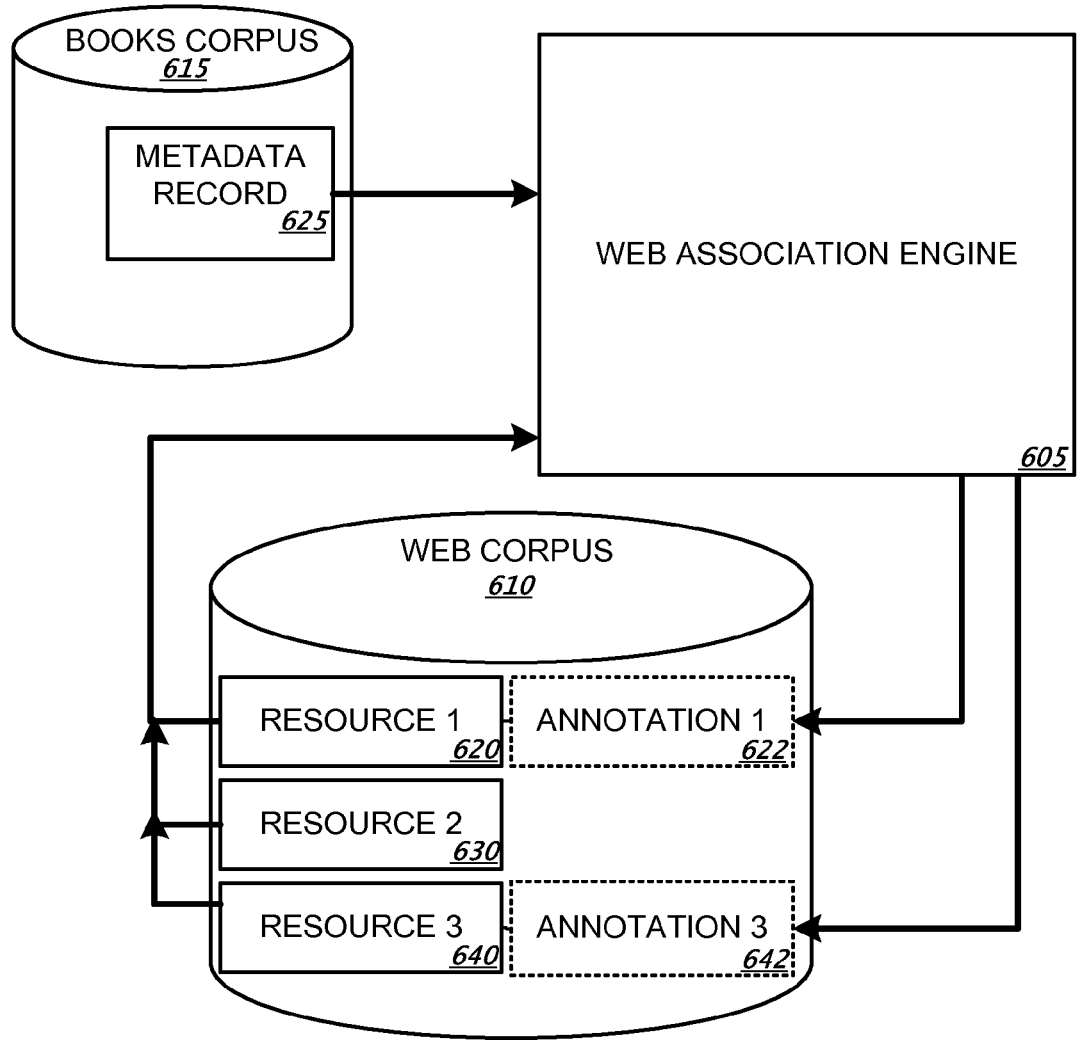
FIG. 6 is a diagram of a web association engine.

FIG. 6 is a diagram of a web association engine 605. The web association engine 605 uses the metadata of a book resource 625 from the books corpus 615 to identify network resources in the web corpus 610 that reference the book.

For example, web association engine 605 can read each of network resources 620, 630, and 640 from web corpus 610. The content of these resources can be analyzed by the web association engine 605. In some implementations, the web association engine 605 determines a confidence value and a topicality value for each network resource.

In some implementations, the confidence value 612 is a measure of the likelihood that the resource references a book. For example, for the example query "last chinese chef," a website giving a review for the book "The Last Chinese Chef" would generate a high confidence value. On the other hand, a website that contained a listing of Chinese chefs would generate a low confidence value, because it is very unlikely that the website refers to the book entitled "The Last Chinese Chef."

In some implementations, the topicality value of the resource represents the degree to which the website is about the book. For example, a website providing a review of the book "The Last Chinese Chef" would generate a high topicality value because the content of the review likely concerns the book itself On the other hand, a website containing a listing of best-selling books would return a low topicality value because the content of a mere list of books would be unlikely to contain many details about the book.

In some implementations, the web association engine 605 determines whether the confidence and topicality values meet thresholds such that a reference to the resource can be added to an annotation associated with each web resource. In some implementations, the annotations (e.g. annotation 622 and 642) are used to build the rich result provided in response to a book query. In the example shown in FIG. 6, the resource 630 is not annotated because at least one of its confidence or topicality values do not meet corresponding thresholds in the web association engine 605.

Figure 7:
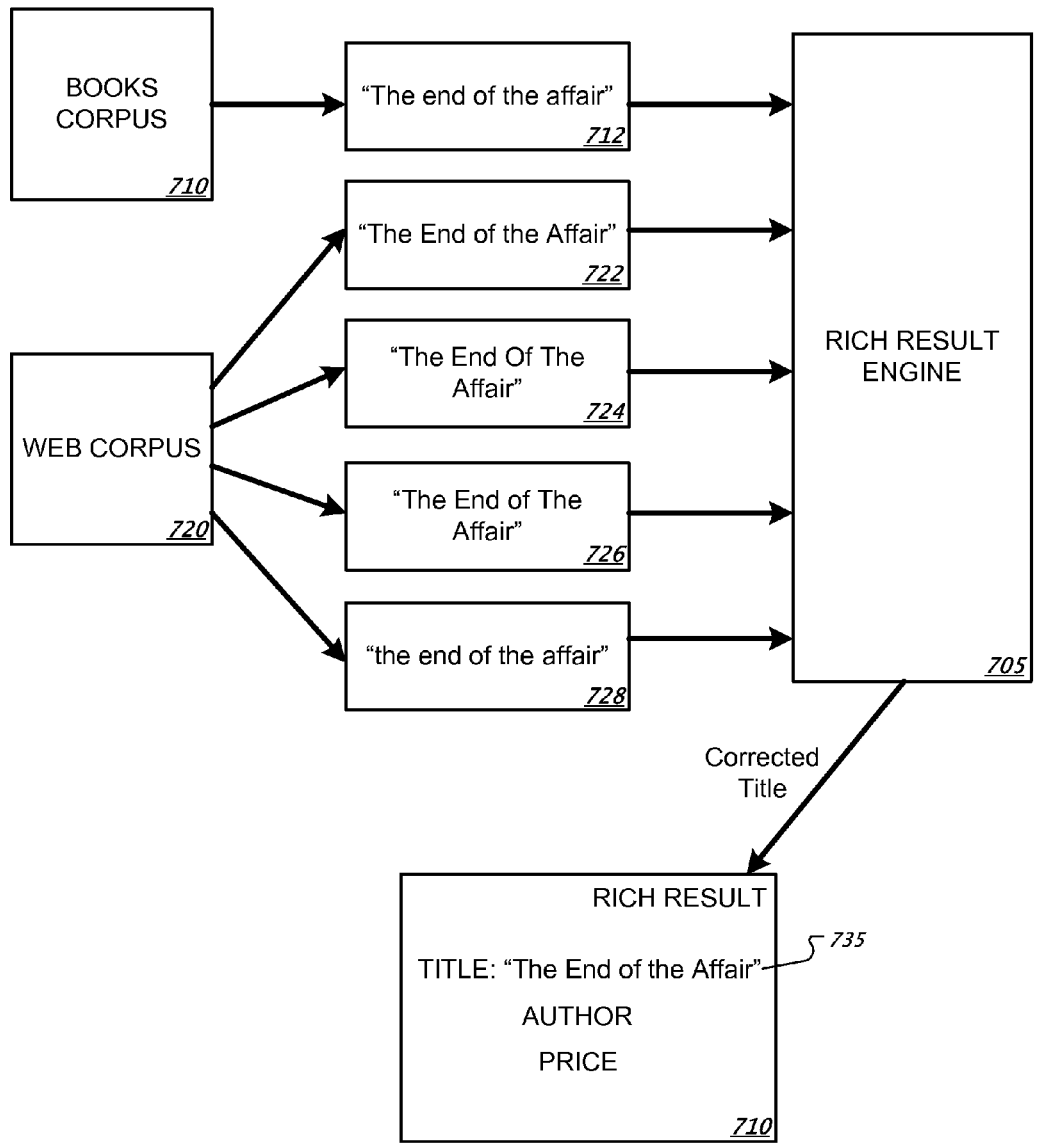
FIG. 7 is a diagram of an example of correcting data with the rich result engine.

FIG. 7 is a diagram of an example of correcting data with the rich result engine 705. The rich result engine can improve data quality by comparing variations across multiple corpora to determine a correct variation of a data item. The rich result engine can be implemented as one or more modules of computer software running on a system of one or more computers.

For example, when obtaining information for the rich result 710, the search system may encounter various ways of capitalizing the title of a book. For example, the search system may have encountered the variant capitalizations shown in the resources 714 (obtained from the books corpus 710) and resources 722, 724, 726, and 728 (obtained from the web corpus 720).

In some implementations, the rich result engine 705 determines the correct capitalization of the title by using the most popular variation among the web resources obtained from the web corpus 720.

The rich result engine 705 can use these same mechanisms to resolve a variety of data problems. For example, the rich result engine 705 can determine whether the rich result should contain "Bill Clinton" or "William Jefferson Clinton" or identify them as alternative names for the same person. Additionally, the rich result engine 705 can determine the true authors of a book, and discard other people associated with a book who have been incorrectly identified as authors, e.g., an author of a preface, a translator, or an editor of a new edition.

When the rich result engine 705 has determined the correct variation of a particular piece of information, the rich result engine 705 can update the rich result 710 provided by the search system. For example, the rich result 710 can be updated with the correct capitalization of the title "The End of the Affair" 735.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. For example, generating book results (315, FIG. 3) can be performed in parallel to other operations, including generating web results (325, FIG. 3) and generating products results (330, FIG. 3). Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    receiving a query requesting a publication search, the publication search being a search of a corpus of digital book resources that each relate to a respective particular book;
    obtaining publication search results responsive to the query from the corpus of digital book resources, each publication search result identifying a respective resource previously identified as relating specifically to books, each publication search result identifying a respective digital book resource in the corpus of digital book resources;
    determining that a score for a first publication search result ranked first in a ranked order of publication search results satisfies a threshold relative to respective scores of other publication search results, wherein a rich result is provided for the first publication search result if the score satisfies the threshold, and wherein a rich result is not provided for the first publication search result if the score does not satisfy the threshold, and wherein the first publication search result is associated with a book;
    in response to determining that a score for a first publication search result ranked first in a ranked order of publication search results satisfies a threshold relative to respective scores of other publication search results, searching a corpus of web resources using data associated with the first publication search result to obtain one or more web resources that refer to the book;
    generating a rich result for the first publication search result, where the rich result comprises data from the first publication search result and data from the one or more web resources, wherein the data from the one or more web resources comprises one or more of price information for the book, a link to a website related to the book, a snippet of the book, or data identifying one or more authors of the book; and
    providing the rich result with one or more other publication search results.

2. The method of claim 1, wherein the score for the first publication search result satisfies the threshold if the score is at least a threshold multiple of a score for a publication search result ranked second in the ranked order of publication search results.

3. The method of claim 1, wherein the score for the first publication search result satisfies the threshold if the score is at least a threshold multiple of a score for a publication search result ranked third or fourth in the ranked order of publication search results.

4. The method of claim 1, wherein the rich result comprises price information for the book.

5. The method of claim 4, further comprising:
    obtaining the price information for the book from a products corpus.

6. The method of claim 5, wherein obtaining the price information for the book from a products corpus comprises:
    obtaining products results from the products corpus using an ISBN corresponding to the book; and
    determining a price for the book using the products results.

7. The method of claim 6, further comprising obtaining the ISBN from the data associated with the first publication search result.

8. The method of claim 1, wherein generating a rich result comprises:
    determining, from the one or more web resources that refer to the book, that an element of data associated with the first publication search result is incorrect; and
    in response to determining that an element of data associated with the first publication search result is incorrect, replacing, in the generated rich result, the element of data with an alternative element of data.

9. The method of claim 8, wherein determining, from the one or more web resources that refer to the book, that an element of data associated with the first publication search result is incorrect comprises:
    obtaining, from the one or more web resources that refer to the book, multiple variants of the element of data associated with the book;
    determining a most popular variant of the multiple variants based on occurrences of the most popular variant in the web resources that refer to the book; and
    determining that the element of data associated with the book does not match the most popular variant,
    wherein replacing, in the generated rich result, the element of data with an alternative element of data comprises replacing the element of data with the most popular variant.

10. The method of claim 1, wherein the rich result comprises a snippet of the book.

11. The method of claim 10, wherein the snippet comprises an excerpt from the book.

12. The method of claim 10, wherein the snippet comprises a summary of the book.

13. The method of claim 1, wherein the rich result comprises data identifying one or more authors of the book.

14. The method of claim 9, wherein the element of data is data identifying an author of the book.

15. The method of claim 1, wherein the rich result comprises a link to a preview of the book.

16. The method of claim 1, wherein the rich result comprises a link to a website related to the book.

17. The method of claim 16, wherein the website is a website of a book seller.

18. The method of claim 1, wherein the rich result further comprises publisher information for the book.

19. The method of claim 18, wherein the publisher information comprises a link to a website of a publisher of the book.

20. The method of claim 9, wherein the element of data is data identifying a publisher of the book.

21. A system comprising:
    one or more computers and one or more storage devices storing instructions that are operable, when executed by the one or more computers, to cause the one or more computers to perform operations comprising:
        receiving a query requesting a publication search, the publication search being a search of a corpus of digital book resources that each relate to a respective particular book;
        obtaining publication search results responsive to the query from the corpus of digital book resources, each publication search result identifying a respective resource previously identified as relating specifically to books, each publication search result identifying a respective digital book resource in the corpus of digital book resources;

determining that a score for a first publication search result ranked first in a ranked order of publication search results satisfies a threshold relative to respective scores of other publication search results, wherein a rich result is provided for the first publication search result if the score satisfies the threshold, and wherein a rich result is not provided for the first publication search result if the score does not satisfy the threshold, and wherein the first publication search result is associated with a book;

in response to determining that a score for a first publication search result ranked first in a ranked order of publication search results satisfies a threshold relative to respective scores of other publication search results, searching a corpus of web resources using data associated with the first publication search result to obtain one or more web resources that refer to the book;

generating a rich result for the first publication search result, where the rich result comprises data from the first publication search result and data from the one or more web resources, wherein the data from the one or more web resources comprises one or more of price information for the book, a link to a website related to the book, a snippet of the book, or data identifying one or more authors of the book; and providing the rich result with one or more other publication search results.

22. The system of claim 21, wherein the score for the first publication search result satisfies the threshold if the score is at least a threshold multiple of a score for a publication search result ranked second in the ranked order of publication search results.

23. The system of claim 21, wherein the score for the first publication search result satisfies the threshold if the score is at least a threshold multiple of a score for a publication search result ranked third or fourth in the ranked order of publication search results.

24. The system of claim 21, wherein the rich result comprises price information for the book.

25. The system of claim 24, wherein the operations further comprise:

obtaining the price information for the book from a products corpus.

26. The system of claim 25, wherein obtaining the price information for the book from a products corpus comprises:

obtaining products results from the products corpus using an ISBN corresponding to the book; and determining a price for the book using the products results.

27. The system of claim 26, wherein the operations further comprise obtaining the ISBN from the data associated with the first publication search result.

28. The system of claim 21, wherein generating a rich result comprises:

determining, from the one or more web resources that refer to the book, that an element of data associated with the first publication search result is incorrect; and in response to determining that an element of data associated with the first publication search result is incorrect, replacing, in the generated rich result, the element of data with an alternative element of data.

29. The system of claim 28, wherein determining, from the one or more web resources that refer to the book, that an element of data associated with the first publication search result is incorrect comprises:

obtaining, from the one or more web resources that refer to the book, multiple variants of the element of data associated with the book;

determining a most popular variant of the multiple variants based on occurrences of the most popular variant in the web resources that refer to the book; and determining that the element of data associated with the book does not match the most popular variant, wherein replacing, in the generated rich result, the element of data with an alternative element of data comprises replacing the element of data with the most popular variant.

30. The system of claim 21, wherein the rich result comprises a snippet of the book.

31. The system of claim 30, wherein the snippet comprises an excerpt from the book.

32. The system of claim 30, wherein the snippet comprises a summary of the book.

33. The system of claim 21, wherein the rich result comprises data identifying one or more authors of the book.

34. The system of claim 29, wherein the element of data is data identifying an author of the book.

35. The system of claim 21, wherein the rich result comprises a link to a preview of the book.

36. The system of claim 21, wherein the rich result comprises a link to a website related to the book.

37. The system of claim 36, wherein the website is a website of a book seller.

38. The system of claim 21, wherein the rich result further comprises publisher information for the book.

39. The system of claim 38, wherein the publisher information comprises a link to a website of a publisher of the book.

40. The system of claim 29, wherein the element of data is data identifying a publisher of the book.

41. A computer program product, encoded on one or more non-transitory computer storage media, comprising instructions that when executed by one or more computers cause the one or more computers to perform operations comprising:

receiving a query requesting a publication search, the publication search being a search of a corpus of digital book resources that each relate to a respective particular book;

obtaining publication search results responsive to the query from the corpus of digital book resources, each publication search result identifying a respective resource previously identified as relating specifically to books, each publication search result identifying a respective digital book resource in the corpus of digital book resources;

determining that a score for a first publication search result ranked first in a ranked order of publication search results satisfies a threshold relative to respective scores of other publication search results, wherein a rich result is provided for the first publication search result if the score satisfies the threshold, and wherein a rich result is not provided for the first publication search result if the score does not satisfy the threshold, and wherein the first publication search result is associated with a book;

in response to determining that a score for a first publication search result ranked first in a ranked order of publication search results satisfies a threshold relative to respective scores of other publication search results, searching a corpus of web resources using data associated with the first publication search result to obtain one or more web resources that refer to the book;

generating a rich result for the first publication search result, where the rich result comprises data from the first publication search result and data from the one or more web resources, wherein the data from the one or more web resources comprises one or more of price information for the book, a link to a website related to the book, a snippet of the book, or data identifying one or more authors of the book; and providing the rich result with one or more other publication search results.

42. The computer program product of claim 41, wherein the score for the first publication search result satisfies the threshold if the score is at least a threshold multiple of a score for a publication search result ranked second in the ranked order of publication search results.

43. The computer program product of claim 41, wherein the score for the first publication search result satisfies the threshold if the score is at least a threshold multiple of a score for a publication search result ranked third or fourth in the ranked order of publication search results.

44. The computer program product of claim 41, wherein the rich comprises price information for the book.

45. The computer program product of claim 44, further comprising:

obtaining the price information for the book from a products corpus.

46. The computer program product of claim 45, wherein obtaining the price information for the book from a products corpus comprises:

obtaining products results from the products corpus using an ISBN corresponding to the book; and determining a price for the book using the products results.

47. The computer program product of claim 46, wherein providing a products corpus with an ISBN comprises obtaining the ISBN from the data associated with the first publication search result.

48. The computer program product of claim 41, wherein generating a rich result comprises:

determining, from the one or more web resources that refer to the book, that an element of data associated with the first publication search result is incorrect; and in response to determining that an element of data associated with the first publication search result is incorrect, replacing, in the generated rich result, the element of data with an alternative element of data.

49. The computer program product of claim 48, wherein determining, from the one or more web resources that refer to the book, that an element of data associated with the first publication search result is incorrect comprises:

obtaining, from the one or more web resources that refer to the book, multiple variants of the element of data associated with the book;

determining a most popular variant of the multiple variants based on occurrences of the most popular variant in the web resources that refer to the book; and determining that the element of data associated with the book does not match the most popular variant, wherein replacing, in the generated rich result, the element of data with an alternative element of data comprises replacing the element of data with the most popular variant.

50. The computer program product of claim 41, wherein the rich result comprises a snippet of the book.

51. The computer program product of claim 50, wherein the snippet comprises an excerpt from the book.

52. The computer program product of claim 50, wherein the snippet comprises a summary of the book.

53. The computer program product of claim 41, wherein the rich result comprises data identifying one or more authors of the book.

54. The computer program product of claim 49, wherein the element of data is data identifying an author of the book.

55. The computer program product of claim 41, wherein the rich result comprises a link to a preview of the book.

56. The computer program product of claim 41, wherein the rich result comprises a link to a website related to the book.

57. The computer program product of claim 56, wherein the website is a website of a book seller.

58. The computer program product of claim 41, wherein the rich result further comprises publisher information for the book.

59. The computer program product of claim 58, wherein the publisher information comprises a link to a website of a publisher of the book.

60. The computer program product of claim 49, wherein the element of data is data identifying an publisher of the book.

61. A computer implemented method comprising:

receiving a query requesting a publication search, the publication search being a search of a corpus of digital book resources that each relate to a particular book;

obtaining publication search results responsive to the query from the corpus of book resources;

determining that a score for a first publication search result ranked first in a ranked order of publication search results satisfies a threshold relative to respective scores of other publication search results, where the first publication search result is associated with a book, wherein the score for the first publication search result satisfies the threshold if the score is at least a threshold multiple of a score for a publication search result ranked second, third, or fourth in the ranked order of publication search results, and wherein a rich result is provided for the first publication search result if the score satisfies the threshold, and wherein a rich result is not provided for the first publication search result if the score does not satisfy the threshold;

searching a corpus of web resources using data associated with the first publication search result to obtain one or more web resources that refer to the book;

generating a rich result for the first publication search result, where the rich result comprises data from the first publication search result and data from the one or more web resources, wherein the data from the one or more web resources comprises one or more of price information for the book, a link to a website related to the book, a snippet of the book, or data identifying one or more authors of the book; and providing the rich result with one or more other publication search results.

\* \* \* \* \*